March 5, 1940.　　　　　J. H. COHEN　　　　　2,192,812

FAN

Original Filed July 26, 1937

INVENTOR
Joseph H. Cohen
BY
ATTORNEY

Patented Mar. 5, 1940

2,192,812

UNITED STATES PATENT OFFICE 2,192,812

FAN

Joseph H. Cohen, Bridgeport, Conn., assignor to Casco Products Corporation, Bridgeport, Conn., a corporation of Connecticut Original application July 26, 1937, Serial No. 155,673. Divided and this application June 10, 1938, Serial No. 212,862

5 Claims. (Cl. 230—259)

This invention relates to fans, and, more particularly, to fans for circulating air.

This application is a division of my copending application, Serial No. 155,673, filed July 26, 1937.

In making fans for circulating air, it is essential that the rotating elements be dynamically balanced so that there will not be any whipping action due to the uneven weight distribution when rotated at high speeds. Dynamic unbalance may be caused by several factors. One factor may be the mounting of the blades on the hub improperly and unsymmetrically with respect to the axis of rotation of the hub. Another factor may be the means for mounting the hub upon the drive shaft of the motor.

The second factor mentioned above for causing dynamic unbalance of the rotary elements resides in the manner in which the hub is secured to the shaft of the motor. If, for example, a set screw is used, it is difficult to get to for adjustment since a hole must be provided in the hub through which an instrument can be inserted to turn the screw. Both the screw and hole in the hub will alter the weight of the hub so that some provision must be made to counterbalance the same.

According to the present invention, the securing means is positioned in the hub so as to extend longitudinally of the hub along its axis of rotation. In this manner, unbalance of the hub is avoided and the necessity of counterbalancing is removed.

Another feature of the present invention resides in the mounting of the adjusting means for the clamping element so that it may be readily accessible from the outside without having to provide a separate aperture for the insertion of the tool. In the present invention, the bolt which moves the clamping elements into gripping relation is mounted in the nose of the hub and extends along the axis of rotation of the hub. By turning this bolt, the clamping elements are moved into gripping position to securely hold the hub to the drive shaft of the motor.

Other features and advantages will be apparent from the specification taken in connection with the drawing, in which.

Figure 1:
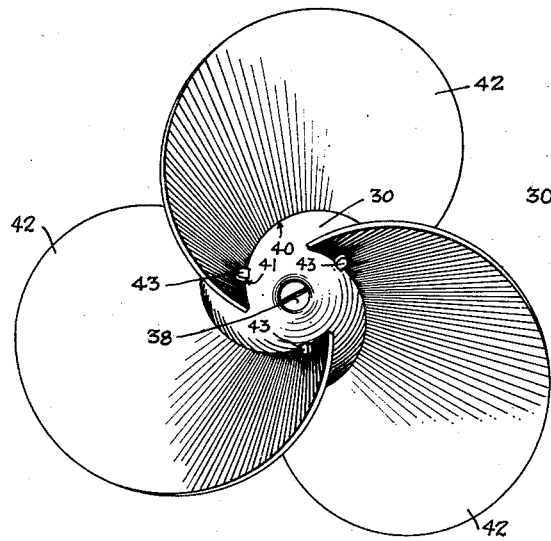
Figure 1 is a front elevation.

According to the present invention, a fan motor 20 has secured to its bottom surface a plate 21 having a socket therein. The plate 21 may be secured to the motor housing in any desired manner, preferably by welding. Mounted to pivot on the plate is a clamping member 22 adapted to extend into cooperative relation with the socket in the plate to receive a supporting member 23 which is herein shown as having a ball fitting in the socket whereby the motor may be universally adjusted. A screw 24 is threaded into the plate and extends through the clamping member to lock the motor in adjusted position.

Figure 2:
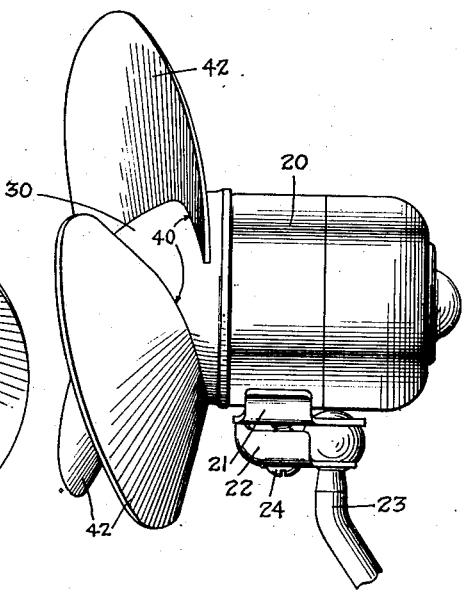
Fig. 2 is a side elevation.
Figure 3:
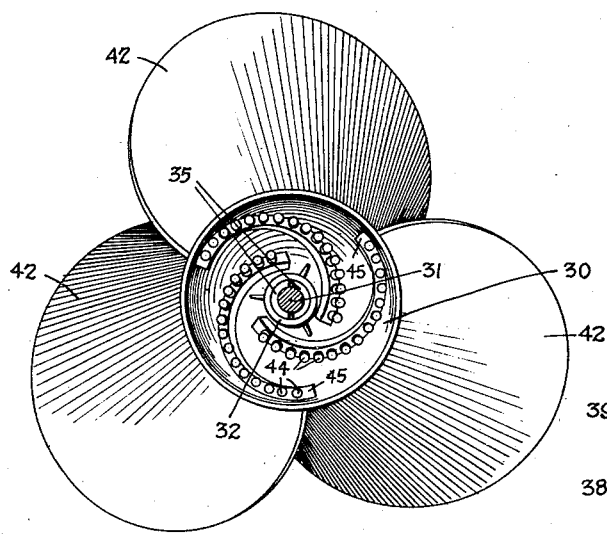
Fig. 3 is a rear view showing the hub and blades.
Figure 4:
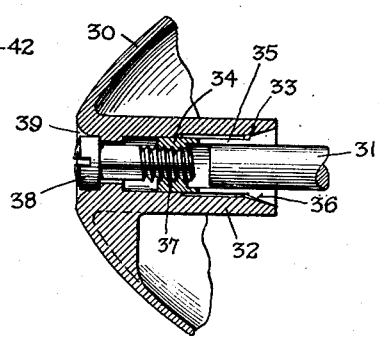
Fig. 4 is a detailed section of the clamping means.

A hollow cup-shaped hub 30 is mounted at the forward end of the motor, and, as shown in Fig. 2, is shaped to slightly overlap the forward edge of the motor housing and tapers into a nose at the front of the fan. Difficulty has been experienced in mounting such hollow hubs on the drive shaft of the motor so as not to destroy the dynamic balance of the rotating element. Accordingly, the hub is provided with an inwardly-extending sleeve 32, extending axially of the hub and concentric with the axis of rotation of the hub. This sleeve may be formed integrally with the hub or may be separately made and secured thereto. The sleeve has a camming surface 33 formed in its bore. Mounted to slide in the bore of the sleeve 32 is a clamping sleeve 34 having a bore of sufficient size to receive a motor shaft 31. The end of the sleeve, adapted to receive the motor shaft, is split so as to form a plurality of clamping elements 35. These clamping elements have camming surfaces 36 thereon, adapted to engage and cooperate with the camming surface 33 within the sleeve when moved relatively thereto. The other end of the clamping sleeve is provided with a wall having threads 37 therein which are adapted to cooperate with a bolt 38 mounted in a recess 39 at the nose of the hub so as to lie below the surface of the hub. The bolt extends along the axis of the hub, and, upon being rotated, slides the clamping sleeve relative to the sleeve 32 whereby the camming surface will move the clamping elements into clamping relation with the end of the motor shaft. Since all the elements are symmetrically positioned with respect to the axis of rotation of the hub, the hub will always be dynamically balanced.

A further feature of the invention resides in the accessibility of the bolt 38 whereby the hub may be clamped to the motor shaft. In prior practice, it has been customary to provide the hub with a sleeve similar to the present sleeve 32 and have a set screw therein adapted to be moved into engagement with the motor shaft. The hollow hub had to be provided with an aperture through which a tool could be extended to engage and adjust the set screw. Aside from destroying the balance of the hub, the set screw was very difficult to reach when it was desired to attach or remove the hub from the shaft. According to the present invention, however, the head of the bolt is open to view and easy access since it is positioned adjacent the outer surface of the hub and may be readily operated to lock the hub to the shaft or remove the same therefrom.

As shown in Figs. 1 and 2, the hub is provided with three symmetrically arranged slots 40. These slots are uniform in width and extend from the base of the hub forwardly toward the nose thereof in a substantially helical path. Adjacent their forward ends, the slots 40 are provided with a pair of recesses 41 on their side edges. These slots are adapted to receive the fan blades of the fan.

In the preferred form of the invention, a blade 42 is made of flexible rubber and is adapted to be inserted from the inside of the hub. Adjacent its forward end or that end nearest the nose of the hub, the blade has a projection 43 extending from each face of the blade to engage the recesses 41 in the slot to hold the blade from sliding in the slot due to the pressure of the air on the blade when in operation. This effectively prevents shifting of the blade and thereby the weight distribution of the blade about the axis of the hub and maintains the rotating element in dynamic balance.

The blade may be secured in the slots in any convenient manner. In the preferred form of the invention, the edge positioned within the hub is provided with a plurality of separate projecting elements or lugs 44. In forming the edge with such projecting lugs, a much greater flexibility is imparted to the blades than if the series of lugs were made into a solid rib. A solid rib may be used, however, when such flexibility is not required. At each end of the engaging edge of the blade, a projection or wing 45 is formed in the plane of the blade and extends to engage the inner surface of the wall to further prevent the blade from being thrown outwardly through the slot by centrifugal force when the blade is set in motion.

Variations and modifications may be made within the scope of this invention and portions of the improvements may be used without others.

I claim:

1. In a fan, a hub having a sleeve extending inwardly thereof along the axis of the hub; blades mounted on the hub; a drive shaft having the end thereof disposed within the sleeve; means within the sleeve and coaxial with the shaft for gripping the sides of the drive shaft with a radial pressure; and means for operating said first-named means to hold the hub thereon and against relative rotation with respect thereto when the fan is under load.

2. In an electric fan, a hub; blades mounted on the hub; a motor having a drive shaft; means for clamping the hub to the drive shaft comprising camming surfaces and cooperating clamping elements extending axially of the hub and positioned to engage the sides of the drive shaft for a substantial area thereof; and means extending axially of the hub for moving the clamping elements relative to the camming means and laterally with respect to the shaft into clamping relation with the drive shaft to lock the hub thereto.

3. In an electric fan, a hub; blades mounted on the hub; a motor having a drive shaft; means for clamping the hub to the drive shaft comprising a sleeve on the hub mounted to extend axially thereof and provided with a camming surface in its bore; clamping elements mounted to slide in the sleeve and having parts adapted to engage the camming surface; and means for sliding the clamping elements to move them relative to the camming surface of the sleeve to cause them to move laterally to clamp the drive shaft and hold the hub thereon against relative movement.

4. In an electric fan, a hub; blades mounted on the hub; a motor having a drive shaft; means for clamping the hub to the drive shaft comprising a sleeve on the hub mounted to extend axially thereof and provided with a camming surface in the bore; and a clamping sleeve slidable in the bore and having one end slit so as to form clamping elements adapted to cooperate with the camming surface in the bore, and the other end threaded to engage a bolt mounted in the hub to extend axially of the same whereby when the bolt is turned the clamping sleeve will slide and move the clamping elements laterally into the gripping relation with the drive shaft.

5. In a fan, a hub; blades mounted on the hub; a drive shaft; means for clamping the hub to the drive shaft comprising the sleeve formed on the hub to extend axially thereof; a clamping sleeve slidable in the sleeve and having resilient clamping elements thereon provided with camming surfaces cooperable with the inwardly projecting sleeve, the clamping sleeve having a bore to receive the drive shaft; and means mounted in the nose of the hub in axial alignment with the hub for moving the clamping sleeve in the inwardly projecting sleeve to cause the camming surfaces to move the clamping elements laterally into gripping relation with the sides of the drive shaft, said means for moving the clamping sleeve being readily accessible for operating the clamping sleeve after the hub has been mounted on the drive shaft.

JOSEPH H. COHEN.